(12) United States Patent
Kamei et al.

(10) Patent No.: US 6,422,632 B1
(45) Date of Patent: *Jul. 23, 2002

(54) VEHICLE OCCUPANT PROTECTION SYSTEM

(75) Inventors: Takahiro Kamei; Tatsuo Iwabe; Yasushi Kawamura; Makoto Tsuruta; Yasuki Motozawa; Kazuya Yoshida, all of Wako (JP)

(73) Assignee: Honda Giken Kogyo Kabushi Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/648,190

(22) Filed: Aug. 23, 2000

(30) Foreign Application Priority Data

Aug. 24, 1999 (JP) ............................................ 11-236282

(51) Int. Cl.$^7$ .............................. B62D 21/00; B60N 2/42
(52) U.S. Cl. .................... 296/68.1; 296/189; 297/216.1; 297/216.16; 297/216.18
(58) Field of Search ............................. 296/68.1, 65.02, 296/188, 189; 297/216.1, 216.16, 216.13, 216.18

(56) References Cited

U.S. PATENT DOCUMENTS

| 2,959,446 A | 11/1960 | Thompson | 296/68.1 |
| 3,001,815 A | 9/1961 | Weber | 296/68.1 |

(List continued on next page.)

FOREIGN PATENT DOCUMENTS

| DE | 3424-928 A | 1/1986 |
| DE | 4323543 C | 10/1994 |
| DE | 4415467 C1 | 11/1995 |
| DE | 19938940 A | 3/2000 |
| GB | 1043695 | 9/1966 |
| GB | 2340801 A | 3/2000 |
| GB | 2340802 A | 3/2000 |
| JP | 5-238287 | 9/1993 |
| JP | 5-246252 | 9/1993 |
| JP | 5-246253 | 9/1993 |
| JP | 7-101354 | 4/1995 |
| JP | 7-205733 | 8/1995 |
| JP | 2000-62556 | 2/2000 |
| JP | 2000-62557 | * 2/2000 |
| WO | WO 94/22692 | 10/1994 |
| WO | WO 98/40238 | 9/1998 |

OTHER PUBLICATIONS

English Abstract of DE4415467C1, 2001.

(List continued on next page.)

Primary Examiner—Stephen T. Gordon
Assistant Examiner—Patricia Engle (57) ABSTRACT

As a moveable part of the vehicle body carrying a vehicle seat moves rearward under the action of an active or passive power source as a result of a vehicle crash, the seat belt which is anchored at the moveable part at one end and a fixed part of the vehicle body at another end is pulled rearward, and performs the function to apply a deceleration to the vehicle occupant in an early phase of the vehicle crash. This is followed by a slight slackening of the seat belt as the moveable part is subjected to a forward force. The active power source typically consists of a high pressure gas generating device, and a passive power source typically consists of a G control member which transmits the deceleration of a vehicle crash to the vehicle occupant from an early phase of the crash, and/or a stopper which applies a forward force to the moveable part as the moveable part moves rearward by a prescribed distance under the action of the power source. Thus, an early application of a forward deceleration followed by the application of an acceleration which tends to mitigate the unacceptable sharp rise of the deceleration of the vehicle occupant achieves a desirable time history of deceleration for the vehicle occupant, and minimizes the injury to the vehicle occupant for a given stroke of deformation of the vehicle body.

6 Claims, 6 Drawing Sheets

U.S. PATENT DOCUMENTS

| | | | |
|---|---|---|---|
| 3,732,944 A | | 5/1973 | Kendall .................... 180/274 |
| 3,897,101 A | | 7/1975 | Hess ....................... 296/68.1 |
| 3,961,805 A | * | 6/1976 | Satzinger ............... 296/68.1 X |
| 3,992,046 A | | 11/1976 | Braess .................... 296/68.1 |
| 3,998,291 A | | 12/1976 | Davis ...................... 180/91 |
| 4,156,472 A | | 5/1979 | Kunz ...................... 177/25.13 |
| 4,832,409 A | | 5/1989 | Borlinghaus et al. ....... 297/468 |
| 4,881,781 A | | 11/1989 | Borlinghaus et al. ....... 297/473 |
| 5,167,421 A | | 12/1992 | Yunzhao ................. 297/216.18 |
| 5,286,085 A | | 2/1994 | Minami ................... 297/250.1 |
| 5,409,262 A | | 4/1995 | McLennan ................. 280/784 |
| 5,437,494 A | | 8/1995 | Beauvais ................. 297/216.19 |
| 5,626,203 A | | 5/1997 | Habib ..................... 180/274 |
| 5,636,424 A | | 6/1997 | Singer et al. ............ 29/407.01 |
| 5,681,057 A | | 10/1997 | Whirley et al. ............ 280/784 |
| 5,685,603 A | | 11/1997 | Lane, Jr. ................. 297/216.11 |
| 5,746,467 A | | 5/1998 | Jesdanont ................ 296/68.1 |
| 5,810,417 A | | 9/1998 | Jesdanont ................ 296/68.1 |
| 5,947,543 A | * | 9/1999 | Hubbard .................. 296/68.1 |
| 6,003,937 A | | 12/1999 | Dutton et al. ............ 297/216.1 |
| 6,042,190 A | | 3/2000 | Mathe et al. ............. 297/483 |
| 6,092,853 A | * | 7/2000 | Hubbard .................. 296/68.1 |
| 6,116,561 A | | 9/2000 | Christopher .............. 248/429 |
| 6,170,865 B1 | | 1/2001 | Barron .................... 280/735 |
| 6,186,574 B1 | | 2/2001 | Motozawa et al. ......... 296/68.1 |
| 6,193,296 B1 | | 2/2001 | Motozawa et al. ......... 296/68.1 |
| 6,224,131 B1 | | 5/2001 | Shammout ................ 296/68.1 |
| 6,227,563 B1 | | 5/2001 | Talisman ................. 296/68.1 |
| 6,227,597 B1 | | 5/2001 | Swann et al. ............. 296/68.1 |
| 6,254,164 B1 | | 7/2001 | Kawanura et al. ......... 296/68.1 |

OTHER PUBLICATIONS

English Abstract of JP7–205733, 2001.

Patent Abstracts of Japan, JP07101354A, 1995, http://www.patents.ibm.com/cgi–bin/viewpat.cmd/JP07101354A2.

Patent Abstracts of Japan, JP200062556, Aug. 10, 2000, http://www/2.ipdl.jpo–miti.go.jp/dbpweb/connecter/guest/DBPquery/ENGDB/wdispaj.

* cited by examiner

VEHICLE OCCUPANT PROTECTION SYSTEM

TECHNICAL FIELD

The present invention relates to a vehicle occupant protection system for improving the vehicle crash safety.

BACKGROUND OF THE INVENTION

In recent years, with the aim of improving the safety of vehicle occupants at the time of a vehicle crash, various vehicle body structures have been proposed in which the deformation mode of the part of a vehicle body other than the passenger compartment is appropriately controlled in such a manner that the deceleration of the passenger compartment of the vehicle is reduced, and the deformation would not reach the passenger compartment (see Japanese patent laid-open publication No. 07-101354 and others).

One of the important factors which determine the seriousness of the injury of a vehicle occupant is the maximum value of the acceleration (or deceleration) of the vehicle occupant. Therefore, to minimize the injury of the vehicle occupant, the deceleration (in case of a frontal crash) should be reduced. The deceleration of the vehicle occupant is produced by the force applied from a restraint system such as a seat belt. Because a seat belt functions as a spring, the maximum value of the deceleration of the vehicle occupant occurs when the elongation of the seat belt is maximized as the vehicle occupant moves forward under the inertia force. The maximum value of the deceleration of the vehicle occupant increases in relation with the increase in the forward travel of the vehicle occupant under the inertia force, and may even exceed the average deceleration of the vehicle body.

When the relationship between the vehicle deceleration and the occupant deceleration is represented by input and output to and from a system consisting of a spring (the restraint system) and mass (the mass of the vehicle occupant), one can appreciate that the maximum elongation of the spring and the time at which this occurs are dictated by the waveform (time history) of the vehicle body deceleration. Therefore, to minimize the vehicle occupant deceleration at the time of a vehicle crash, it is necessary not only to reduce the average deceleration of the vehicle body but also to reduce the overshoot due to the presence of the spring (seat belt), by adjusting the waveform of the vehicle body deceleration.

In most of the conventional vehicle body structures, a crushable zone formed at a front portion of the vehicle body between a crash reaction generating member (such as side beams) and other components is allowed to deform so as to absorb the impact energy, and the waveform of the vehicle body deceleration is adjusted by changing the reaction property through appropriate selection of dimensions of various parts.

Figure 9:
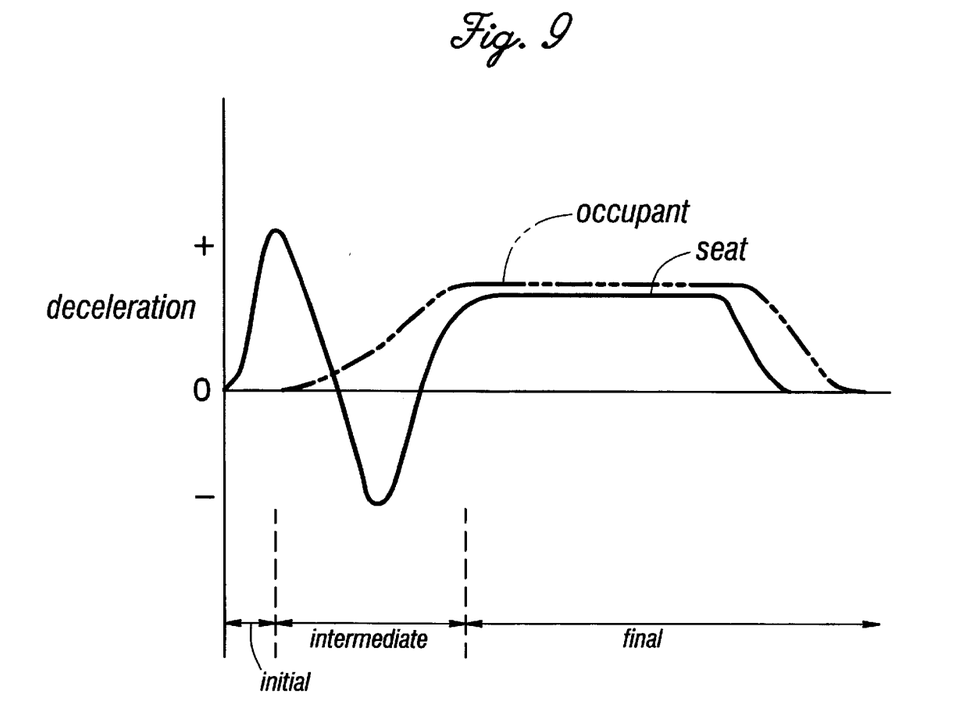
FIG. 9 is a graph showing desirable deceleration waveforms of the moveable part of the vehicle body and the vehicle occupant.

In any case, there is no doubt that the waveform of the vehicle body deceleration is an important factor in reducing the injury of the vehicle occupant. FIG. 9 shows a waveform of the deceleration of the seat belt that would favorably control the vehicle occupant deceleration according to the foregoing considerations. As indicated by the solid line, a deceleration which is greater than the average deceleration of the vehicle body is initially produced for a prescribed (short) time period, and then, a deceleration in the opposite direction is produced for another prescribed (short) time period. Thereafter, the seat is allowed to decelerate at the average deceleration. According to simulation runs conducted by the inventors, it was found that such a waveform of the vehicle seat deceleration can reduce the vehicle occupant deceleration more favorably than applying a constant deceleration (square wave) if the distance for the vehicle to decelerate (or the dynamic stroke) is the same.

According to a conventional vehicle body structure, a relatively weaker part of the crushable zone tends to deform initially, and it is followed by the deformation of a relatively stronger part of the crushable zone. Therefore, the waveform of the crash reaction or the vehicle body deceleration demonstrates a relatively low initial level which is followed by a period of a high level, and this is not desirable in reducing the deceleration of the vehicle occupant. To eliminate this problem, it has been proposed to achieve a constant reaction by controlled collapsing of the side beams, and to maintain a stable reaction by providing a plurality of partition walls in the side beams (Japanese patent laid open publication No. 07-101354).

However, such proposals were only capable of allowing the vehicle to decelerate at a constant rate (square wave), and were not suited for achieving a desirable deceleration waveform as shown in FIG. 9. To reduce the deceleration of the vehicle occupant from that of the conventional arrangement, it is necessary to achieve the waveform of the vehicle seat deceleration as shown in FIG. 9.

Proposals have been made in copending U.S. Pat. application Ser. Nos. 09/377,366 and 09/376,888 both filed on Aug. 18, 1999, to impart a relative deceleration and acceleration to the vehicle seat or the member carrying the vehicle seat with respect to the main part of the vehicle body so that the vehicle occupant may experience a deceleration from an early stage of a vehicle crash, and the maximum vehicle occupant deceleration may be reduced by distributing the inertia force acting on the vehicle occupant over a longer period of time. In such previously proposed arrangements, the seat belt was incorporated in the seat as opposed to the convention seat belt which is attached to the vehicle body except for the seat belt buckle which is normally attached to the seat. There are additional copending U.S. patent applications of later filing dates which also relate to similar subject matters. The contents of these applications are hereby incorporated in this application by reference.

However, as it is preferable to minimize the weight of the vehicle body and to use a standard seat belt having a retractor attached to the vehicle body, a further improvement of the arrangement is desired.

BRIEF SUMMARY OF THE INVENTION

In view of such a recognition by the inventors, a primary object of the present invention is to provide a vehicle occupant protection system which can favorably reduce the vehicle occupant deceleration at the time of a vehicle crash by using a highly simple structure.

A second object of the present invention is to provide a vehicle occupant protection system which is adapted to the standard design of the seat belt and the vehicle body.

A third object of the present invention is to provide a vehicle occupant protection system which would not substantially increase the weight of the vehicle body.

According to the present invention, such objects can be accomplished by providing an automotive vehicle occupant protection system, comprising: a moveable part of a vehicle body including a vehicle seat and moveable in a fore-and-aft direction with respect to a vehicle body; a power source which is adapted to apply a rearward force to the moveable part in an early phase of a vehicle crash, and a forward force to the moveable part immediately following the early phase; a seat belt for the seat having a first anchor point which is attached to the moveable part, and a second anchor point which is attached to a fixed part of the vehicle body.

Thus, as the moveable part moves rearward as a result of a vehicle crash, the seat belt is pulled rearward, and performs the function to apply a deceleration to the vehicle occupant in an early phase of the vehicle crash. This is followed by a slight slackening of the seat belt as the moveable part is subjected to a forward force. Thus, an early application of a forward deceleration followed by the application of an acceleration which tends to mitigate the unacceptable sharp rise of the deceleration of the vehicle occupant achieves a desirable time history of deceleration for the vehicle occupant, and minimizes the injury to the vehicle occupant for a given stroke of deformation of the vehicle body.

The power source may consist of an active power actuator such as a high pressure gas generating device for applying a rearward force and/or forward force to the moveable part. Alternatively, the power source may comprise an impact transmitting member such as a G control member which forms a part of the moveable part, and is adapted to apply a rearward force to the moveable part as the impact transmitting member receives an impact from a vehicle crash. Also, the power source may comprise a stopper member which is interposed between the moveable part and a fixed part of the vehicle body, the stopper being adapted to collide with the moveable part as the moveable part moves rearward with respect to the vehicle body under the rearward force.

Typically, the first anchor point consists of a seat belt buckle, and the second anchor point consists of a shoulder anchor of the seat belt. The anchor points may include a third anchor point which may be attached either to the moveable part or to a fixed part of the vehicle body.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
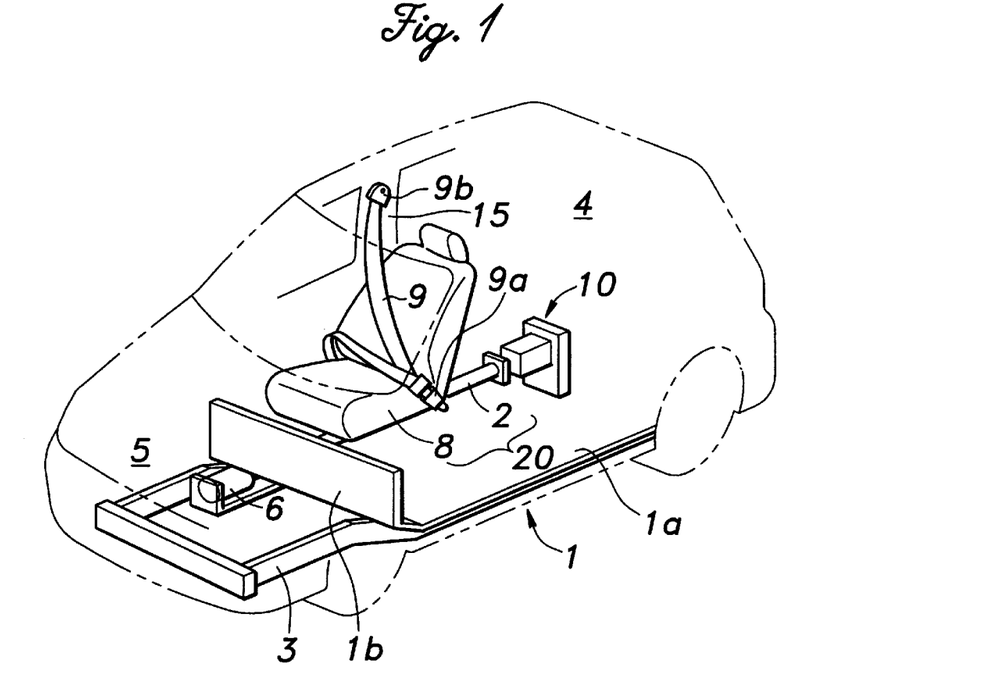
FIG. 1 is a perspective view of an essential part of an automotive vehicle body embodying the present invention.
Figure 2:
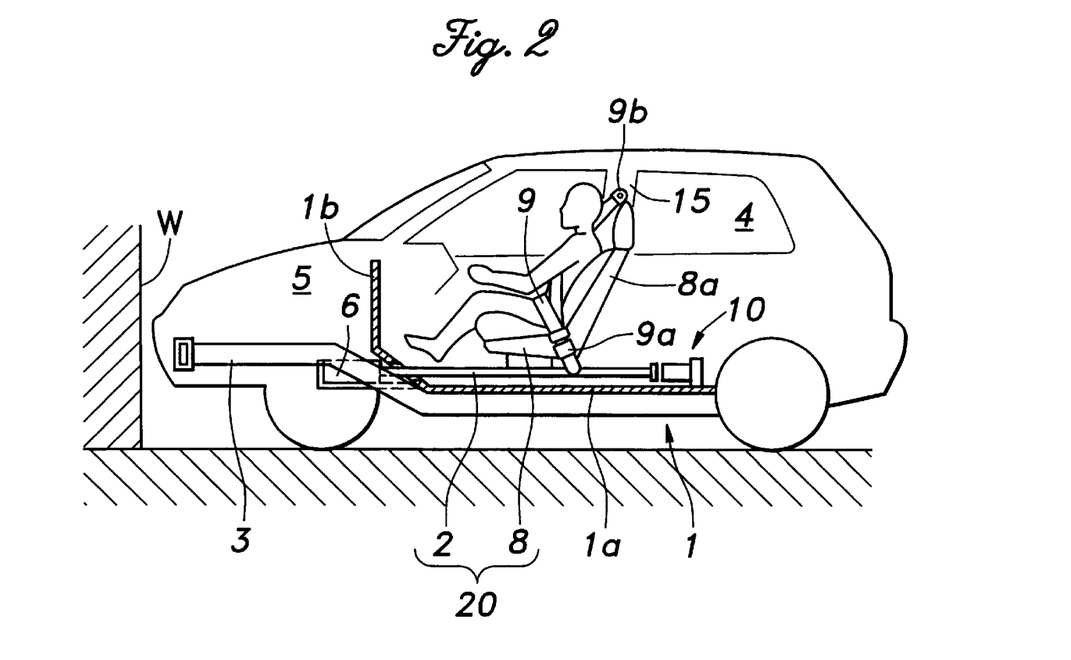
FIG. 2 is a simplified side view of vehicle body.

FIG. 1 is a perspective view showing an essential part of an automotive vehicle body embodying the present invention. As shown in this drawing, a seat base frame 2 is placed on a vehicle body 1 so as to be moveable in the fore-and-aft direction of the vehicle body. To clarify the illustration, the seat base frame 2 is simplified as a rod-like member, but in practice may consist of any frame structure or member. As shown in FIG. 2 also, the vehicle body 1 comprises a floor section 1a of a passenger compartment 4 which is integrally attached to an upper surface of a pair of side beams 3 extending from the front end to the rear end of the vehicle body on either side of the vehicle body to serve as major energy absorbing members, and a bulkhead section 1b extending upward from the front edge of the floor section 1a to the lower edge of the front windshield at the boundary between the passenger compartment 4 and an engine room 5.

The seat base frame 2 extends in the fore-and-aft direction in parallel with the floor section 1a of the vehicle body 1. The front end of the seat base frame 2 is provided with a power actuator 6 consisting of a high pressure gas generating device, and the rear end of the seat base frame 2 is provided with a damping device 10 which consists of a passive stopper as described hereinafter.

A seat 8 is mounted on the seat base frame 2, and may be provided with a seat slide adjustment arrangement disposed between the seat 8 and the seat base frame 2 although it is not shown in the drawings because the arrangement by itself is convention, and the structure thereof forms no part of the present invention. The seat base frame 2 and the seat 8 jointly form a moveable part 20 which is normally integral with the vehicle body 1, but can move in the fore-and-aft direction relative to the vehicle body 1 at the time of a vehicle crash as described hereinafter.

The seat 8 is provided with a seat belt 9 which has three anchor points. A seat belt buckle 9a fixedly attached to a side of the seat 8 forms a first anchor point, and a shoulder anchor 9b fixedly attached to an upper part of a center pillar forms a second anchor point. A waist belt anchor 9c (FIG. 4) which is fixedly attached to a lower part of the center pillar 15 or a vehicle body part adjacent thereto at the end of the waist belt remote from the seat belt buckle 9a forms a third anchor point. Alternatively, the waist belt anchor 9c may also be attached to the corresponding side of the seat 8. In any case, the seat belt 8 is by itself conventional, and is provided with a tongue plate which is fitted to an intermediate part of the seat belt 9, and is adapted to latch into the seat belt buckle 9a.

Figure 3:
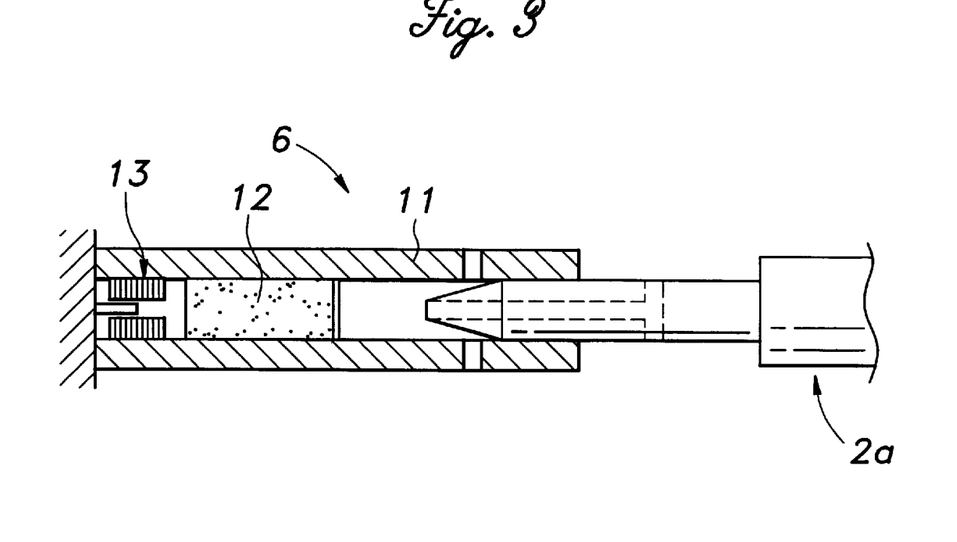
FIG. 3 is an enlarged sectional view of the power actuator for the seat base frame.

Referring to FIG. 3, the front end of the seat base frame 2 is provided with a rod portion 2a which is received in a cylinder 11 of the high pressure gas generating device 6. This cylinder 11 is fixedly attached to the vehicle body 1. A propellant 12 for generating high pressure gas is received deep inside the cylinder 11, and is adapted to be ignited by an ignition device 13 upon detection of a vehicle crash by a sensor not shown in the drawings. The high pressure gas produced from the propellant 12 applies a thrust to the rod portion 2a of the seat base frame 2, and thereby gives a rearward acceleration to the moveable part 20.

The rear end of the seat base frame 2 is adapted to be engaged by the damping device 10 following a prescribed rearward travel of the seat base frame 2 relative to the vehicle body 1. The damping device 10 may, for instance, consist of a stopper consisting of a honeycomb structure which abuts the rear end of the seat base frame 2 as the latter moves rearward by a prescribed distance relative to the vehicle body 1, and the resultant reaction produces an opposite deceleration or a forward acceleration that will be applied to the seat base frame 2 and the vehicle seat 8.

Figure 4:
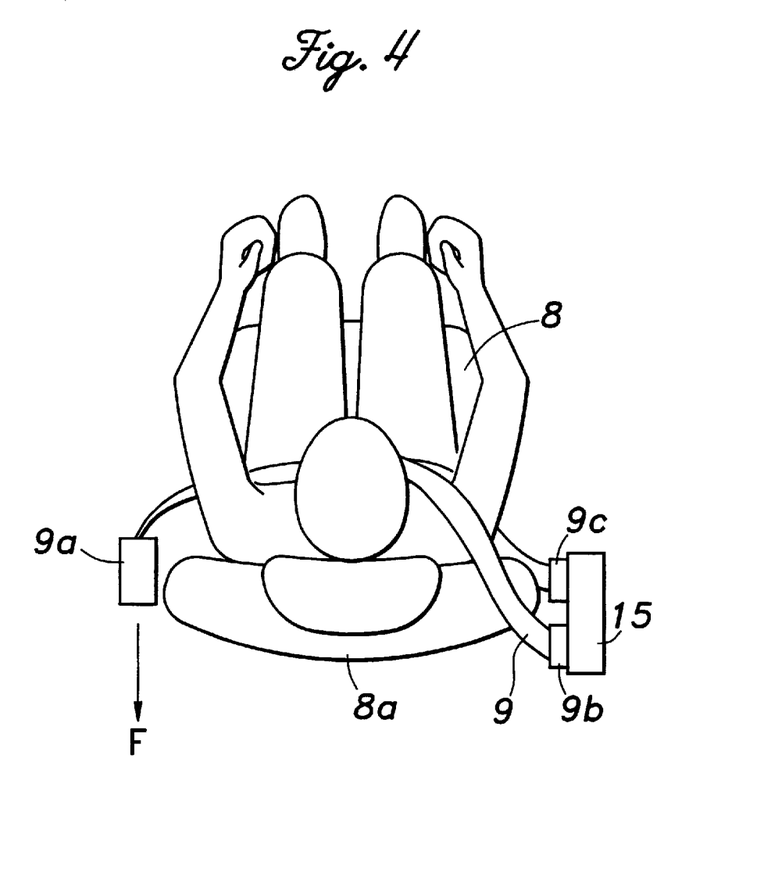
FIG. 4 is a top view:; of the vehicle seat and the associated seat belt.

Referring to FIG. 4, the vehicle occupant is restrained by the seat belt 9 which is anchored to the center pillar 15 at two points (9b and 9c), and to the seat 8 or the moveable part 20 at one point (9a). It should be noted that the vehicle occupant is subjected to a forward inertia force at the time of a vehicle crash, and is restrained mainly by the seat belt 9. Otherwise, the vehicle occupant would be thrown forward relative to the vehicle body 1. In other words, the vehicle occupant can be subjected to a controlled forward deceleration at such a time primarily owing to the restraint by the seat belt 9, and the level of the forward deceleration can be controlled most effectively by adjusting the tension of the seat belt 9. For instance, if the seat belt buckle 9a is moved rearward with respect to the vehicle body as indicated by arrow F, the deceleration acting on the vehicle occupant will be increased, and vice versa.

Now the mode of operation of the above described structure at the time of a vehicle crash is described in the following with reference to FIGS. 5 to 8.

Figure 5:
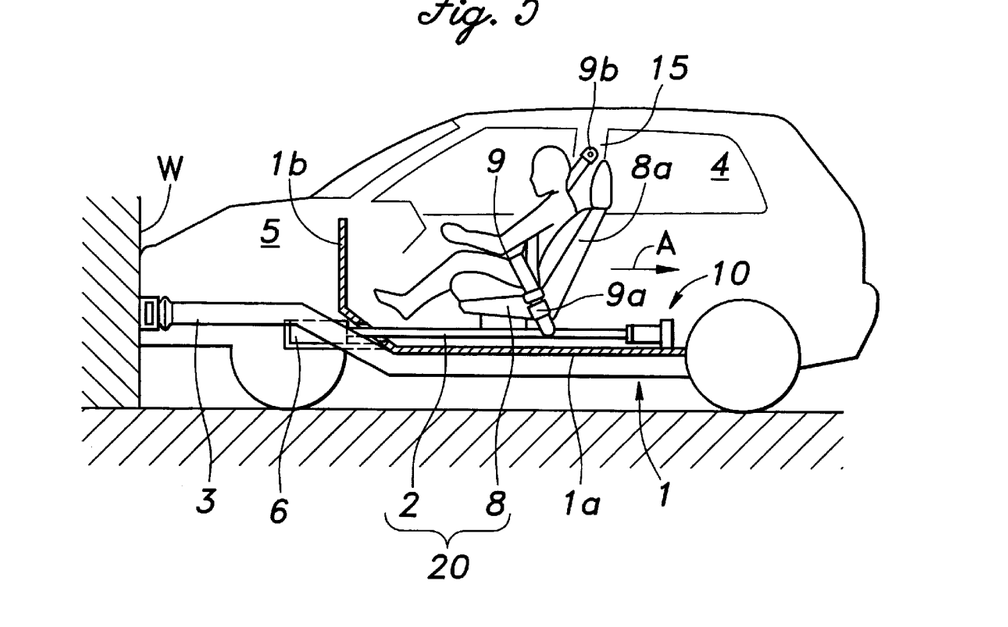
FIG. 5 is a view similar to FIG. 2 showing an initial phase of a vehicle crash.

Referring to FIG. 5, as the vehicle crashes onto an object W, the front panel section of the outer body shell collapses, and the projecting front ends of the side beams 3 crash onto the object W immediately thereafter. As the side beams 3 collapse, a prescribed deceleration is produced, and this is immediately followed by the ignition of the propellant 12. The produced high pressure gas pushes the rod portion 2a rearward, and a rearward acceleration (as indicated by arrow A in the drawing) is produced in the seat base frame 2 or the moveable part 20. As a result, the vehicle occupant experiences a deceleration due to the rearward movement of the moveable part 20 in addition to the deceleration due to the collapsing of the vehicle body 1 or the vehicle body (initial phase of the crash).

At this stage, because the deceleration of the vehicle occupant is almost entirely due to the restraint by the seat belt, it is important how quickly the seat belt 9 acts upon the vehicle occupant. According to the illustrated embodiment, the seat belt buckle 9a is displaced rearward, along with the seat base frame 2, in the early phase of the vehicle crash while the remaining anchor points 9b and 9c remain stationary with respect to the vehicle body 1. Therefore, as seen from the vehicle body, one of the anchor points (9a) of the seat belt 9 is moved rearward, and the seat belt 9 is thereby made effective in restraining the vehicle occupant from a relatively early time point of the vehicle crash. It means that the vehicle occupant is allowed to experience the forward deceleration from an early phase of the vehicle crash, and this is beneficial in optimizing the time history of the deceleration of the vehicle occupant as discusses earlier.

Figure 6:
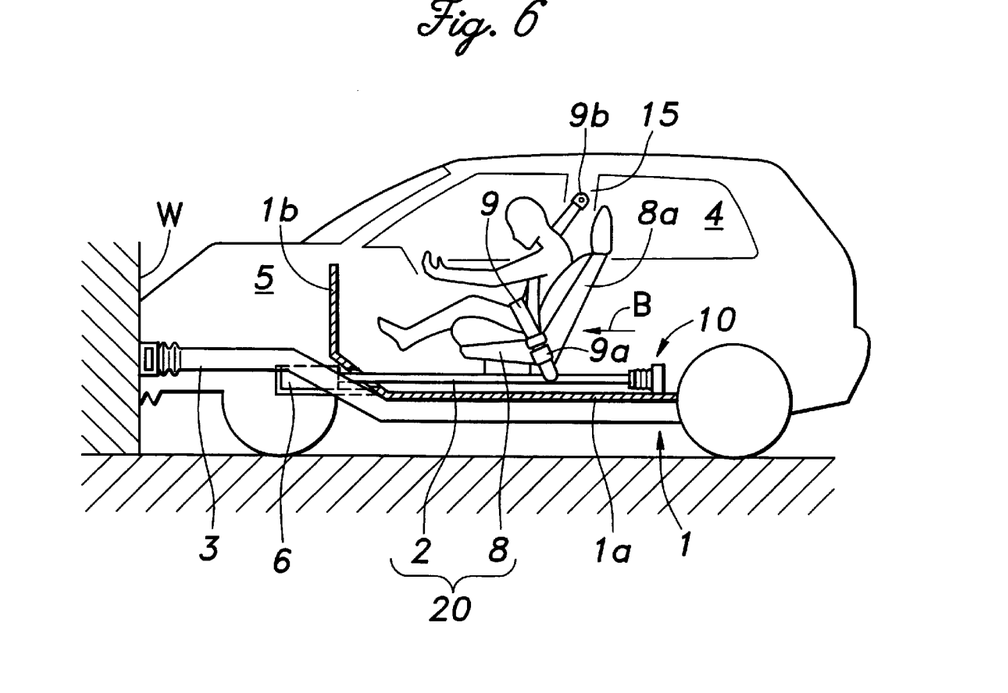
FIG. 6 is a view similar to FIG. 2 showing an earlier part of an intermediate phase of the vehicle crash.

In an early part of an intermediate phase of the crash shown in FIG. 6, the rear end of the seat base frame 2 collides with the damping device 10, and the resulting reaction pushes back the seat base frame 2 so that the moveable part 20 experiences an opposite deceleration or a forward acceleration with respect to the vehicle body (as indicated by arrow B in the drawing). This state of deceleration in the direction of the progress of the crash appears as the deceleration level of the seat which falls into a negative region in FIG. 9, and this reverse deceleration causes the buildup of deceleration acting on the vehicle occupant to be kept below a tolerable level.

Figure 7:
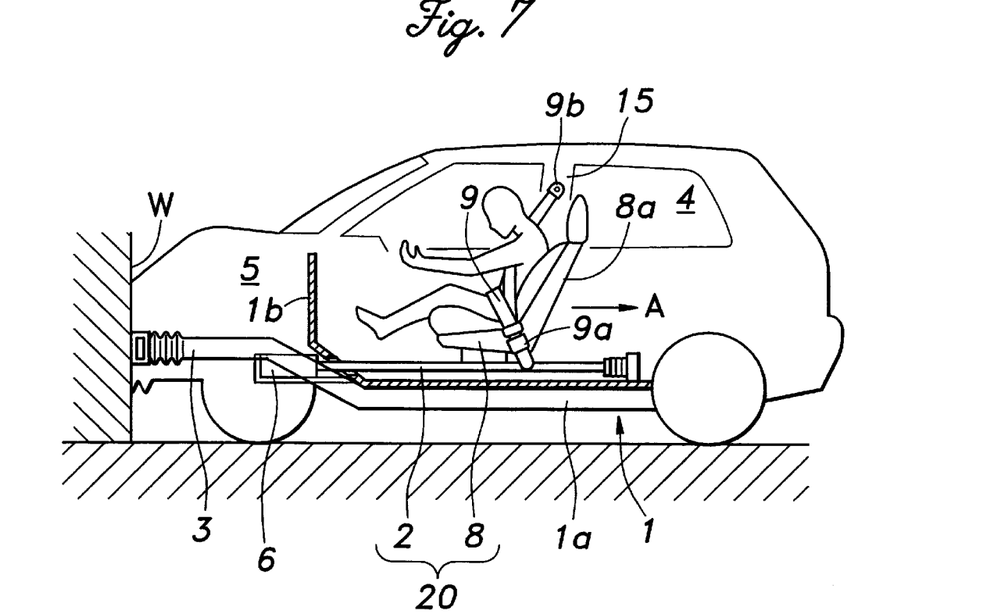
FIG. 7 is a view similar to FIG. 2 showing a later part of the intermediate phase of the vehicle crash.

In a later part of the intermediate phase of the crash illustrated in FIG. 7, thrust from the high pressure gas has already ceased either because the gas is exhausted or vented, and the collision of the rear end of the seat base frame 2 with the damping device 10 has completed because the damping device 10 has completely collapsed. Therefore, the seat base frame 2 along with the seat 8 is allowed to displace or deform with the remaining part of the vehicle body. This state is sometimes referred to as a "ride-down state".

Figure 8:
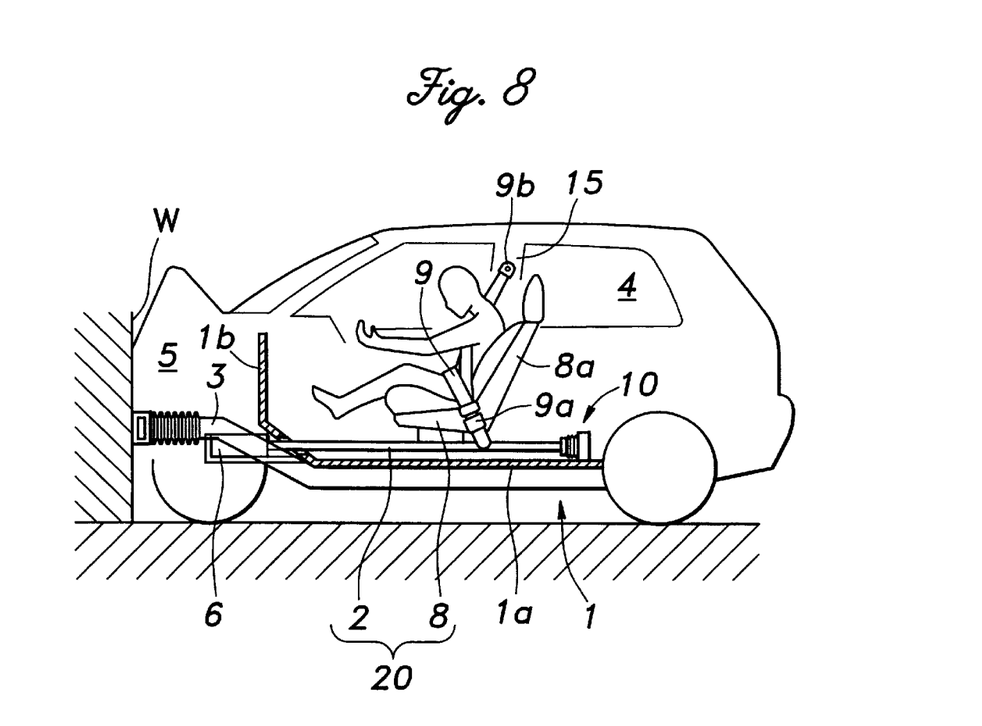
FIG. 8 is a view similar to FIG. 2 showing a final phase of the vehicle crash.

In a final phase of the crash illustrated in FIG. 8, because the moveable part 20 is now integral with the vehicle body 1, the vehicle occupant is in the ride-down state with respect to the vehicle body, and until the completion of the vehicle crash the deceleration of the vehicle body is substantially identical to that of the vehicle occupant (FIG. 9), and maintains a relatively constant level. In this phase, the side beams 3 progressively collapse, and absorb the impact energy while decelerating the vehicle body.

The deformation of the vehicle body at the time of a vehicle crash progresses as described above, and the favorable time history of the vehicle seat deceleration and the vehicle occupant deceleration as shown in FIG. 9 can be achieved. Even when an adequate speed difference cannot be achieved between the moveable part 20 and the vehicle body 1, and the deceleration of the moveable part 20 cannot be adequately reduced into a negative level as shown in FIG. 9, it is still possible to achieve a ride-down state in the final phase of the crash.

A passenger automobile is typically fitted with a pair of seats 8 on either side. The two seats 8 may be mounted on separate seat base frame 2 each connected to an associated power actuator 6 and/or damping device 10. Alternatively, the two seats 8 may be joined integrally to a common seat base frame.

Figure 10:
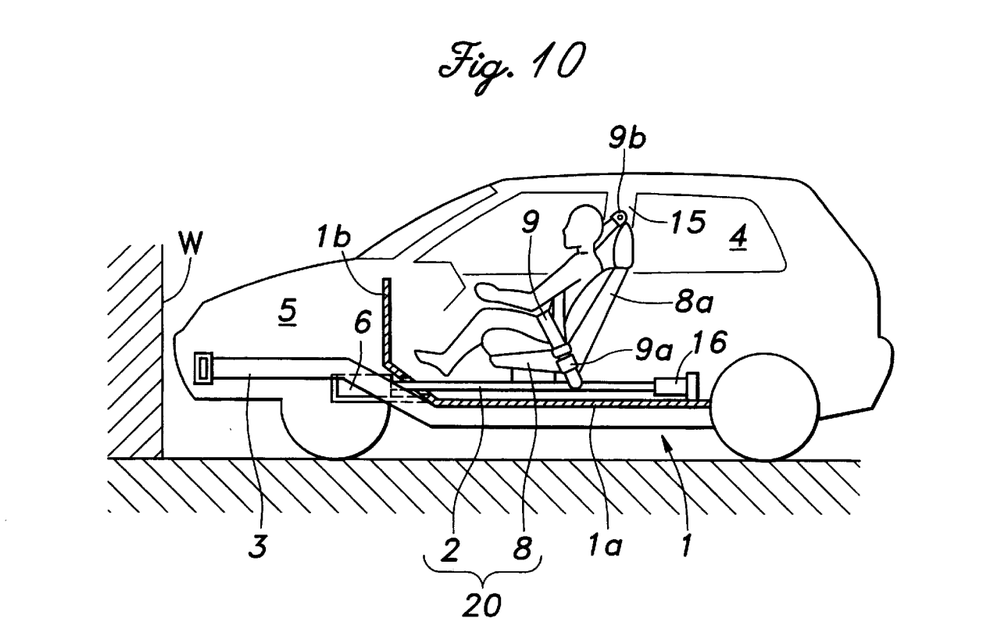
FIG. 10 is a view similar to FIG. 2 showing a second embodiment of the present invention.

A passive damping device 10 was used in this embodiment for applying a forward acceleration to the moveable part 20 in the above described embodiment, but it is also possible to use, instead, a high pressure gas generating device similar to that for the power actuator 6 of the first embodiment. Such an embodiment is illustrated in FIG. 10. An active power actuator 16 similar to the power actuator 6 is provided at the rear end of the seat base frame 2 to serve a similar purpose as the damping device 10. This embodiment is otherwise similar to the previous embodiment, and the corresponding parts are denoted with like numerals.

Figure 11:
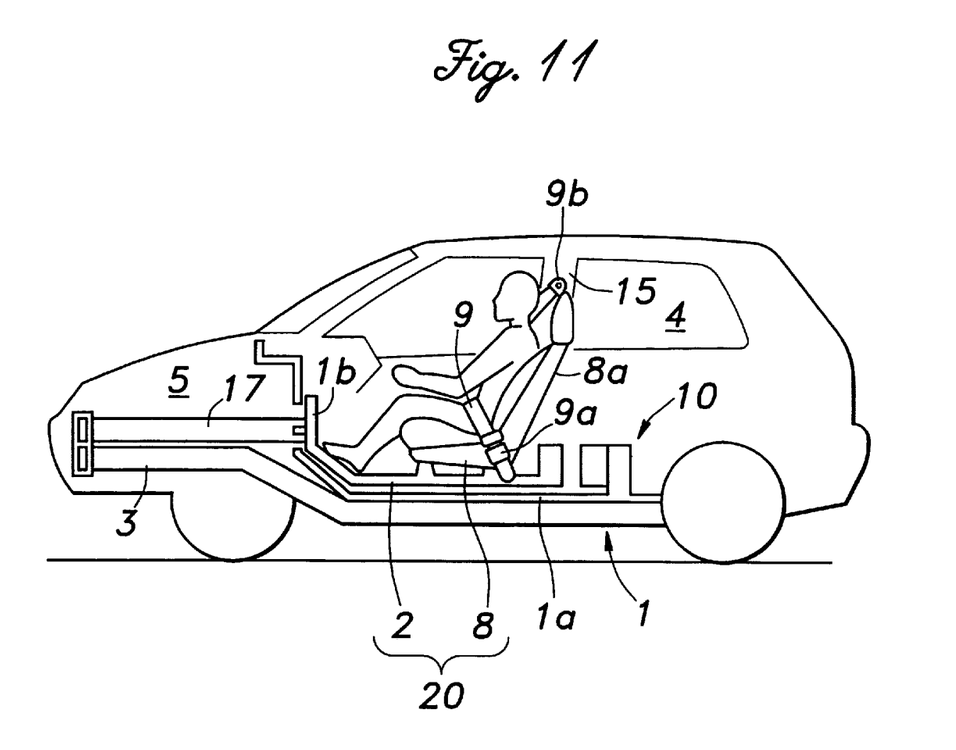
FIG. 11 is a view similar to FIG. 2 showing a third embodiment of the present invention.

The embodiment illustrated in FIG. 11 relies entirely on passive devices for applying both forward and rearward accelerations at the time of a vehicle crash. This embodiment comprises an impact transmitting member in the form of a pair of G control frames 17 extending from the front end of the seat base frame 2, through the bulkhead section 1b of the vehicle body 1. A damping device 10 similar to that for the first embodiment is provided on a part of the floor section 1b adjacent to the rear end of the seat base frame 2. According to this embodiment, when the vehicle crashes head-on onto an object, the side beams 3 collapse before the G control frames 17 do, and the impact of the crash is transmitted to the seat base frame 2 or the moveable part 20 from a relatively early phase of the crash. The damping device 10 applies a forward acceleration to the seat base frame 2 following a prescribed rearward displacement of the moveable part 20 relative to the vehicle body 1 or a certain time delay, and the seat base frame 2 is thereafter allowed to move or collapse integrally with the remaining part of the vehicle body.

As can be appreciated from the foregoing description, according to the present invention, at least one seat belt anchor is provided in a moveable part which is moveable in the fore-and-aft direction relative to the vehicle body, and the moveable part is positively moved in the rearward direction in an early stage of a vehicle crash. The vehicle occupant is thus subjected to a deceleration greater than an average deceleration in an early stage of a vehicle crash through an increased tension of the seat belt, and, thereafter, a forward acceleration is temporarily produced in the moveable part through slight slackening of the seat belt before the entire vehicle body finally decelerates at the average deceleration. Thus, the optimum time history of deceleration for the vehicle occupant can be achieved, and the vehicle occupant is allowed to decelerate without experiencing any intolerable peaks in the deceleration level. Also, because the normal seat and seat belt can be used, instead of a seat incorporated with a seat belt, this arrangement can be readily adapted to a wide range of applications.

Although the present invention has been described in terms of preferred embodiments thereof, it is obvious to a person skilled in the art that various alterations and modifications are possible without departing from the scope of the present invention which is set forth in the appended claims.

What is claimed is:

1. An automotive vehicle occupant protection system, comprising:
   a moveable part of a vehicle body including a vehicle seat and moveable in a fore-and-aft direction with respect to the vehicle body;
   a power system which is adapted to apply a rearward force to said moveable part in an early phase of a vehicle crash, and a forward force to said moveable part immediately following said early phase;
   a seat belt for said seat having a first anchor point which is attached to said moveable part, and a second anchor point which is attached to a fixed part of said vehicle body, wherein
   said power system comprises a power actuator for applying a forward force to said moveable part.

2. An automotive vehicle occupant protection system, comprising:
   a moveable part of a vehicle body including a vehicle seat and moveable in a fore-and-aft direction with respect to the vehicle body;
   a power system which is adapted to apply a rearward force to said moveable part in an early phase of a vehicle crash, and a forward force to said moveable part immediately following said early phase;
   a seat belt for said seat having a first anchor point which is attached to said moveable part, and a second anchor point which is attached to a fixed part of said vehicle body, wherein
   said power system comprises an impact transmitting member which forms a part of said moveable part, and is adapted to apply a rearward force to said moveable part as said impact transmitting member receives an impact from a vehicle crash.

3. An automotive vehicle occupant protection system, comprising:
   a moveable part of a vehicle body including a vehicle seat and moveable in a fore-and-aft direction with respect to a vehicle body;
   a first power source which is adapted to apply a rearward force to said moveable part in an early phase of a vehicle crash, and a second power source which is adapted to apply a forward force to said moveable part immediately following said early phase;
   a seat belt for said seat having a first anchor point which is attached to said moveable part, and a second anchor point which is attached to a fixed part of said vehicle body, wherein
   said second power source comprises a power actuator for applying a forward force to said moveable part.

4. An automotive vehicle occupant protection system, comprising:
   a moveable part of a vehicle body including a vehicle seat and moveable in a fore-and-aft direction with respect to a vehicle body;
   a first power source which is adapted to apply a rearward force to said moveable part in an early phase of a vehicle crash, and a second power source which is adapted to apply a forward force to said moveable part immediately following said early phase;
   a seat belt for said seat having a first anchor point which is attached to said moveable part, and a second anchor point which is attached to a fixed part of said vehicle body,
   wherein said first power source comprises an impact transmitting member which forms a part of said moveable part, and is adapted to apply a rearward force to said moveable part as said impact transmitting member receives an impact from a vehicle crash.

5. An automotive vehicle occupant protection system, comprising:
   a moveable part of a vehicle body including a vehicle seat and moveable in a fore-and-aft direction with respect to a vehicle body;
   a power system comprising a first portion which is adapted to apply a rearward force to said moveable part in an early phase of a vehicle crash, and a second portion which is adapted to apply a forward force to said moveable part immediately following said early phase;
   a seat belt for said seat having a first anchor point which is attached to said moveable part, and a second anchor point which is attached To a fixed part of said vehicle body, wherein
   said second portion of the power system comprises a power actuator for applying a forward force to said moveable part.

6. An automotive vehicle occupant protection system, comprising:
   a moveable part of a vehicle body including a vehicle seat and moveable in a fore-and-aft direction with respect to a vehicle body;
   a power system comprising a first portion which is adapted to apply a rearward force to said moveable part in an early phase of a vehicle crash, and a second portion which is adapted to apply a forward force to said moveable part immediately following said early phase;
   a seat belt for said seat having a first anchor point which is attached to said moveable part, and a second anchor point which is attached to a fixed part of said vehicle body, wherein
   said first portion of the power system comprises an impact transmitting member which forms a part of said moveable part, and is adapted to apply a rearward force to said moveable part as said impact transmitting member receives an impact from a vehicle crash.

* * * * *